(12) United States Patent
Mitsuhashi (10) Patent No.: US 10,573,208 B2
(45) Date of Patent: Feb. 25, 2020

(54) IMAGE DISPLAY APPARATUS

(71) Applicant: SONY CORPORATION, Tokyo (JP)

(72) Inventor: Shoji Mitsuhashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/147,947

(22) Filed: Oct. 1, 2018

(65) Prior Publication Data
US 2019/0043394 A1   Feb. 7, 2019

Related U.S. Application Data

(63) Continuation of application No. 15/319,220, filed as application No. PCT/JP2015/002429 on May 13, 2015, now Pat. No. 10,109,223.

(30) Foreign Application Priority Data

Jul. 2, 2014   (JP) .................. 2014-136789

(51) Int. Cl.
*H04N 9/31*  (2006.01)
*G09G 3/00*  (2006.01)
(Continued)

(52) U.S. Cl.
CPC ......... *G09G 3/002* (2013.01); *G03B 21/2086* (2013.01); *G09G 3/001* (2013.01);
(Continued)

(58) Field of Classification Search
CPC ...... H04N 9/3194; G09G 3/002; G09G 3/001; G09G 3/346; G09G 2330/021; G09G 2354/00; G03B 21/2086
(Continued)

(56) References Cited

U.S. PATENT DOCUMENTS 5,448,377 A    9/1995   Kinoshita et al.
6,460,999 B1  10/2002   Suzuki
(Continued)

FOREIGN PATENT DOCUMENTS

CN   101203801 A   6/2008
CN   103576431 A   2/2014
(Continued)

OTHER PUBLICATIONS

Office Action for CN Patent Application No. 201580034745.2, dated Mar. 29, 2019, 08 pages of Office Action and 07 pages of English Translation.
(Continued)

*Primary Examiner* — Michael Lee
(74) *Attorney, Agent, or Firm* — Chip Law Group (57) ABSTRACT

An image display apparatus according to an embodiment of the present technology includes an image display unit, a calculator, and a notification section. The image display unit includes an emission surface and displays an image by emitting light from the emission surface. The calculator calculates a reference distance from the emission surface, the reference distance serving as a determination criteria for an influence of emitted light that is emitted from the image projection section. The notification section notifies about information on the influence of the emitted light on the basis of the calculated reference distance.

10 Claims, 8 Drawing Sheets

(51) Int. Cl.
  *G03B 21/20* (2006.01)
  *G09G 3/34* (2006.01)
(52) U.S. Cl.
  CPC .......... *G09G 3/346* (2013.01); *H04N 9/3194* (2013.01); *G09G 2330/021* (2013.01); *G09G 2354/00* (2013.01)
(58) Field of Classification Search
  USPC ........................................................ 348/744
  See application file for complete search history.

(56) References Cited

U.S. PATENT DOCUMENTS

| | | | |
|---|---|---|---|
| 2009/0051827 A1 | 2/2009 | Yokoyama et al. | |
| 2009/0147224 A1* | 6/2009 | Kurozuka ............ | H04N 9/3129 353/98 |
| 2010/0157256 A1 | 6/2010 | Itoh et al. | |
| 2010/0177929 A1 | 7/2010 | Kurtz et al. | |
| 2012/0218180 A1 | 8/2012 | Ootsuka | |
| 2013/0128240 A1 | 5/2013 | Yoshida et al. | |
| 2015/0110398 A1 | 4/2015 | Totsuka et al. | |
| 2016/0150203 A1 | 5/2016 | Schlachter et al. | |
| 2017/0114992 A1 | 4/2017 | Dodworth | |

FOREIGN PATENT DOCUMENTS

| | | | |
|---|---|---|---|
| JP | 2001-075170 A | | 3/2001 |
| JP | 2006078971 A | * | 3/2006 |
| JP | 2007-324643 A | | 12/2007 |
| JP | 2009-237061 A | | 10/2009 |
| JP | 2010-243809 A | | 10/2010 |
| JP | 2011-137878 | | 7/2011 |
| JP | 2011-137878 A | | 7/2011 |
| JP | 2013-054370 A | | 3/2013 |
| WO | 2006/137548 A1 | | 12/2006 |

OTHER PUBLICATIONS

Office Action for JP Patent Application No. 2016-530807, dated Jul. 2, 2019, 07 pages of Office Action and 05 pages of English Translation.
Office Action for CN Patent Application No. 201580034745.2, dated Sep. 18, 2019, 05 pages of Office Action and 07 pages of English Translation.
International Search Report and Written Opinion of PCT Application No. PCT/JP2015/002429, dated Aug. 11, 2015, 08 pages of English Translation and 07 pages of ISRWO.
International Preliminary Report on Patentability of PCT Application No. PCT/JP2015/002429, dated Jan. 12, 2017, 08 pages of English Translation and 05 pages of IPRP.
Notice of Allowance and Fees Due for U.S. Appl. No. 15/319,220, dated Jun. 25, 2018, 05 pages.
Non-Final Rejection for U.S. Appl No. 15/319,220, dated Feb. 7, 2018, 05 pages.
Final Rejection for U.S. Appl. No. 15/319,220, dated Oct. 18, 2017, 07 pages.
Non-Final Rejection for U.S. Appl. No. 15/319,220, dated May 4, 2017, 06 pages.

* cited by examiner

IMAGE DISPLAY APPARATUS

CROSS REFERENCE TO RELATED APPLICATIONS

The present application is a continuation application of U.S. patent application Ser. No. 15/319,220, filed on Dec. 15, 2016, which is a U.S. National Phase of International Patent Application No. PCT/JP2015/002429 filed on May 13, 2015, which claims the benefit of Japanese Priority Patent Application JP 2014-136789 filed on Jul. 2, 2014, the entire content of which is incorporated herein by reference.

TECHNICAL FIELD

The present technology relates to an image display apparatus such as a projector.

BACKGROUND ART

Conventionally, image display apparatuses such as projectors have been widely used. For example, light from light sources is modulated by a light modulator such as a liquid-crystal device and the modulated light is projected on a screen or the like, such that an image is displayed. A reflective liquid-crystal display device, a transmissive liquid-crystal crystal device, a DMD (Digital Micromirror Device), or the like is used as the light modulator.

As projectors for presentation or digital cinema, more and more products have recently employed solid-state light sources such as LEDs (Light Emitting Diodes) and LDs (Laser Diodes), not the conventional mercury-vapor lamps, xenon lamps, and the like, as the light sources. It is relatively easy for the solid-state light sources such as the LEDs and LDs to increase the luminance. They are long-lasting, which leads to less frequent lamp replacement. They have an advantage in that they light up immediately after powered on.

Patent Document 1 has disclosed a technology by which it is possible to address a safety problem in that, regarding a projector including laser light sources, user's or image observer's eyes are exposed to projected light with a high luminance (e.g., paragraph, FIG. 2, etc. of Patent Document 1).

Patent Document 1: Japanese Patent Application Laid-open No. 2013-54370

SUMMARY

Problem to be Solved

It is conceivable that the increase in luminance of the projector will be continued. Therefore, a technology enabling safety in use to be enhanced is desirable.

In view of the above-mentioned circumstances, it is an object of the present technology to provide an image display apparatus by which the safety in use can be improved.

Means for Solving the Problem

In order to achieve the above-mentioned object, an image display apparatus according to an embodiment of the present technology includes an image projection section, a calculator, and a notification section.

The image projection section includes an emission surface and projects an image by emitting light from the emission surface.

The calculator calculates a reference distance from the emission surface, the reference distance serving as a determination criteria for an influence of emitted light that is emitted from the image projection section.

The notification section notifies about information on the influence of the emitted light on the basis of the calculated reference distance.

In this image display apparatus, the reference distance is calculated as the distance from the emission surface that serves as the determination criteria for the influence of the emitted light. Then, the information on the influence of the emitted light is presented on the basis of this reference distance. With this, the safety in use can be improved.

The calculator may calculate the reference distance on the basis of a property of the emitted light.

With this, the reference distance can be calculated with a high reliability.

The calculator may calculate the reference distance on the basis of an illuminance of the emitted light or a luminance of the light source.

With this, the safety in use can be improved.

The calculator may calculate, as the reference distance, a distance from the emission surface such that a determination criteria value based on the illuminance of the emitted light or the luminance of the light source is approximately equal to a predetermined threshold.

In this manner, the reference distance can be calculated on the basis of the predetermined threshold.

The predetermined threshold may be a value conforming to international standards.

By the use of the value conforming to the international standards, the reference distance can be calculated with a high reliability.

The image projection section may be capable of projecting the image at a predetermined projection ratio. In this case, the calculator may calculate the reference distance on the basis of the projection ratio.

With this, the reference distance depending on the projection ratio can be calculated.

The image display apparatus may further include an operation section that receives a user's operation. In this case, the calculator may calculate the reference distance according to the user's operation in real time.

With this, the reference distance depending on the user's operation can be calculated.

Information on the influence of the emitted light may include the calculated reference distance.

By presenting the calculated reference distance, the safety in use can be improved.

The notification section may generate image information including information on the influence of the emitted light and cause the image projection section to project the image information.

By displaying the information on the influence of the emitted light in the image, the safety in use can be further improved.

The notification section may output information on the influence of the emitted light as audio.

By outputting the information on the influence of the emitted light as audio, the safety in use can be further improved.

The image display apparatus may further include a storage unit that stores a look-up table for associating a property of the emitted light with the reference distance. In this case, the calculator may calculate the reference distance by referring to the look-up table.

In this manner, the reference distance may be calculated on the basis of the look-up table. With this, the reference distance can be calculated by simple processing.

The image projection section may be capable of projecting the image at a predetermined projection ratio. In this case, the storage unit may store the look-up table for associating the projection ratio with the reference distance.

In this manner, the reference distance may be calculated on the basis of the table focusing on the projection ratio.

The image projection section may include a mounting section on which a plurality of types of projection lens sections are mountable. In this case, the storage unit may store the look-up table corresponding to the plurality of types of projection lens sections.

With this, the reference distance can be easily calculated with respect to each of the plurality of mountable projection lenses.

Effects

As described above, in accordance with the present technology, the safety in use can be improved. It should be noted that the effect described here is not necessarily limitative and may be any effect described in the present disclosure.

DESCRIPTION OF PREFERRED EMBODIMENTS

Hereinafter, embodiments according to the present technology will be described with reference to the drawings.
[Configuration of Image Display Apparatus]

Figure 1:
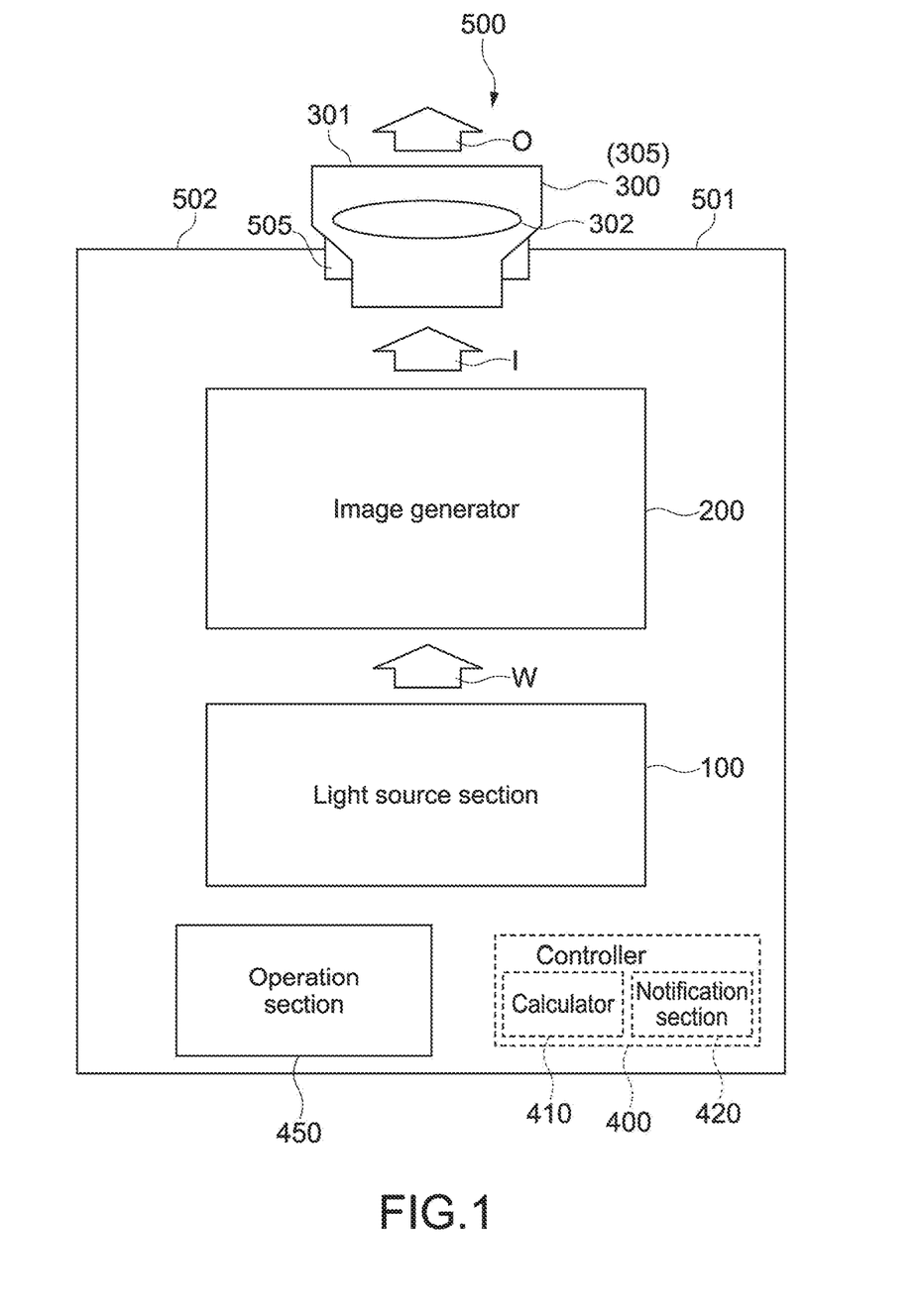
FIG. 1 A diagram showing a schematic configuration example of an image display apparatus according to an embodiment of the present technology.

FIG. 1 is a diagram showing a schematic configuration example of an image display apparatus according to an embodiment of the present technology. An image display apparatus 500 is used as a projector for presentation or digital cinema, for example. The present technology described below is also applicable to image display apparatuses used for the other purposes.

The image display apparatus 500 includes a light source section 100, an image generator 200, and a projection section 300. The light source section 100 is capable of emitting light. The image generator 200 generates an image on the basis of light from the light source section 100. The projection section 300 projects an image (image light I), which has been generated by the image generator 200, on a screen (not shown) or the like. The image display apparatus 500 further includes a controller 400 and an operation section 450. The controller 400 is capable of controlling operations of mechanisms of the image display apparatus 500. The operation section 450 receives an operation from a user.

As shown in FIG. 1, the light source section 100, the image generator 200, and the controller 400 are housed in a casing 501 having an approximately rectangular parallelepiped shape. The projection section 300 is disposed on a front portion 502 of the casing 501. The operation section 450 is disposed on a top portion (not shown) of the casing 501. Note that it is not limited to this configuration and, for example, the light source section 100 may be provided outside the casing 501 and light emitted from the light source section 100 may be introduced into the image generator 200 in the casing 501 through optical fibers and the like.

For example, solid-state light sources such as LEDs and LDs are used as the light source section 100. For example, a light source section including a three-color laser light source and a combining optical system is used. The three-color laser light source emits respective color light beams of RGB. The combining optical system combines those light beams to generate white light W. Alternatively, a light source section having a configuration in which a phosphor wheel or the like is irradiated with blue laser light and the blue laser light and light in the red wavelength region to the green wavelength region that is generated from a fluorescent substance are combined to generate white light may be used. Otherwise, a light source section using a mercury-vapor lamp, a xenon lamp, and the like may be used.

For example, the image generator 200 includes an integrator element, a polarization conversion element, a division optical system that divides the white light W into three color beams of RGB, three light modulators that modulate the respective color light beams, and a combining optical system that combines the modulated color light beams to generate the image light I.

The integrator element functions, as a whole, to adjust incident light, which is emitted from the light source apparatus 100 to the polarization conversion element, to have uniform luminance distribution. The polarization conversion element has a function of equalizing polarization states of the white light W emitted from the integrator element.

The division optical system divides the white light W into the respective color light beams of RGB through a dichroic mirror or the like having a characteristic of selectively reflecting color light having a predetermined wavelength region, for example, and allowing light having other wavelength regions to transmit therethrough. The light modulator modulates incident light for each pixel on the basis of an image signal supplied from a signal source such as a PC (Personal Computer). Three light modulators arranged for the respective color light beams respectively generate a red image, a green image, and a blue image. A reflective liquid-crystal display device, a transmissive liquid-crystal device, a DMD, or the like is used as the light modulator.

The combining optical system superimposes and combines image light beams having the respective colors by, for example, the dichroic prism to generate the image light I. The image light I is emitted to the projection section 300.

The projection section 300 includes an emission surface 301, a lens mechanism 302 including a zoom lens and the like, a diaphragm mechanism (not shown), and a zoom information (projection ratio) output unit (also not shown).

The image light generated by the image generator 200 is emitted from the emission surface 301 to the screen or the like. With this, a full-color image is displayed.

Further, the projection ratio can be adjusted by moving a zoom position of a zoom lens of the lens mechanism 302. For example, the zoom position is moved by the user manually operating a zoom ring or the like. Alternatively, the zoom position may be electrically controlled by pressing a predetermined switch of the operation section 450. As a matter of course, both of the manual adjustment and the electrical adjustment may be possible.

A zoom-information output unit outputs information on the projection ratio, which has been adjusted at that time, to the controller 400. The information on the projection ratio can be detected by a mechanical or electronic method, for example.

In this embodiment, the projection section 300 that functions as a projection lens section 305 is removably mounted on the casing 501. The projection lens section 305 has a tubular shape and includes therein the above-mentioned one or more lenses 302, a predetermined diaphragm mechanism, a zoom-information output unit, and the like.

In the front portion 502 of the casing 501, a mounting section 505 on which the plurality of types of projection lens sections are mountable is formed. The user selects a desired projection lens section 302 and mounts it on the mounting section 505. With this, an image can be projected at desired emitted light power or projection ratio, for example. A specific configuration for mounting the projection lens section 305 is not limited.

Note that the present technology is not limited to the case where the removable projection lens section 305 is used and is applicable also to a case where the projection section 300 having a predetermined configuration is fixed to the casing 501.

The specific configurations of the light source section 100, the image generator 200, and the projection section 300 (projection lens section 305) are not limited and any configurations can be appropriately employed.

For example, the operation section 450 includes a display formed of display devices using liquid-crystal, EL (Electro-Luminescence), or the like and a touch panel configured integrally with this. Otherwise, various input buttons may be provided as the operation section 450. The configuration of the operation section 450 is not limited.

The controller 400 is capable of controlling operations of the respective mechanisms in the image display apparatus 500. For example, by the controller 400 controlling the projection section 300, the brightness, focal point, size, aspect ratio, etc. of an image to be displayed on the screen or the like are controlled. Further, the above-mentioned electrical adjustment of the projection ratio is performed. The controller 400 includes, for example, a CPU (Central Processing Unit), a RAM (Random Access Memory), and a ROM (Read Only Memory). By the CPU loading a program, which has been recorded in the ROM in advance, into the RAM and executing it, various types of processing are executed. The specific configuration of the controller 400 is not limited and any hardware and software can be appropriately used.

As shown in FIG. 1, in this embodiment, by the CPU of the controller 400 executing a predetermined program, a calculator 410 and a notification section 420 are realized. Separately from the controller 400, those blocks may be configured or dedicated hardware may be used. Further, in this embodiment, the storage unit is realized by the ROM or the like of the controller 400. Separately from the controller 400, the storage unit may be configured by the ROM, an HDD (Hard Disk Drive), or the like.

Further, in this embodiment, the image projection section is realized by the light source section 100, the image generator 200, the projection section 300, and the controller 400 that controls them. Therefore, the emission surface 301 of the projection section 300 corresponds to the emission surface of the image projection section. Further, a part of image light emitted from the projection section 300 becomes emitted light (emitted light O) emitted from the image projection section.

[Operation of Image Display Apparatus]

In this embodiment, the calculator 410 calculates the reference distance from the emission surface 301. The reference distance from the emission surface 301 serves as a determination criteria for the influence of the emitted light O emitted from the image projection section. Further, the notification section 420 notifies about the information on the influence of the emitted light O on the basis of the calculated reference distance.

The phrase "influence of the emitted light O" typically means a biological influence of the emitted light O on the eyes of the user (including an operator, an observer, and the like). A case where the user views the emission surface 301 is now considered. In this case, in general, emitted light is radially spread. Therefore, when the user is located relatively near the emission surface 301, the biological influence of the emitted light O on the retina or the like of the user is larger. Thus, it is likely that a hazardous state may be provided. That is, the region near the emission surface 301 is a warning-required region about which sufficient warning is required.

On the other hand, when the user is located at a certain distance from the emission surface 301, the biological influence of the emitted light O entering the eyes is smaller. Thus, it can be said that it is relatively safe. Therefore, the region far from the emission surface 301 is a safe region that would be safe if low warning is given (can also be referred to as low warning region). In this embodiment, the phrase "the reference distance from the emission surface 301 that serves as the determination criteria for the influence of the emitted light O" means a distance that is a reference for determination as to the warning-required region and the safe region. A region at a distance shorter than the reference distance from the emission surface 301 is the warning-required region and a region at a distance longer than the reference distance is the safe region.

In this embodiment, the above-mentioned reference distance is appropriately calculated on the basis of properties of the emitted light O. The properties of the emitted light O include, for example, a light emission property (e.g., emitted light power) of the light source section 100 and a projection property (e.g., projection ratio) of the projection section 300. Alternatively, the reference distance may be calculated on the basis of various properties associated with the emitted light O.

Further, in this embodiment, also when the properties above are changed according to a user's operation or the like, the reference distance can be calculated in real time. Then, on the basis of the reference distance, the information on the influence of the emitted light, for example, the information of the calculated reference distance itself or a warning about entering the warning-required region is presented by image display, audio output, or the like in real time. With this, the safety in use can be improved.

Note that the reference distance only needs to be a criteria for determination as to the warning-required region and the safe region during use of the image display apparatus 500 and does not need to clearly indicate a distance that actually adversely affects the retina or the like and a distance other than that distance. As a matter of course, such a distance may be calculated as the reference distance according to the present technology. However, at least a distance that would be able to reduce the hazard may be calculated as the reference distance. A specific method for calculating the reference distance is not limited. For example, it may be calculated on the basis of various parameters relating to the above-mentioned properties of the emitted light O. Alternatively, it may be derived on the basis of measurement.

Figure 2:
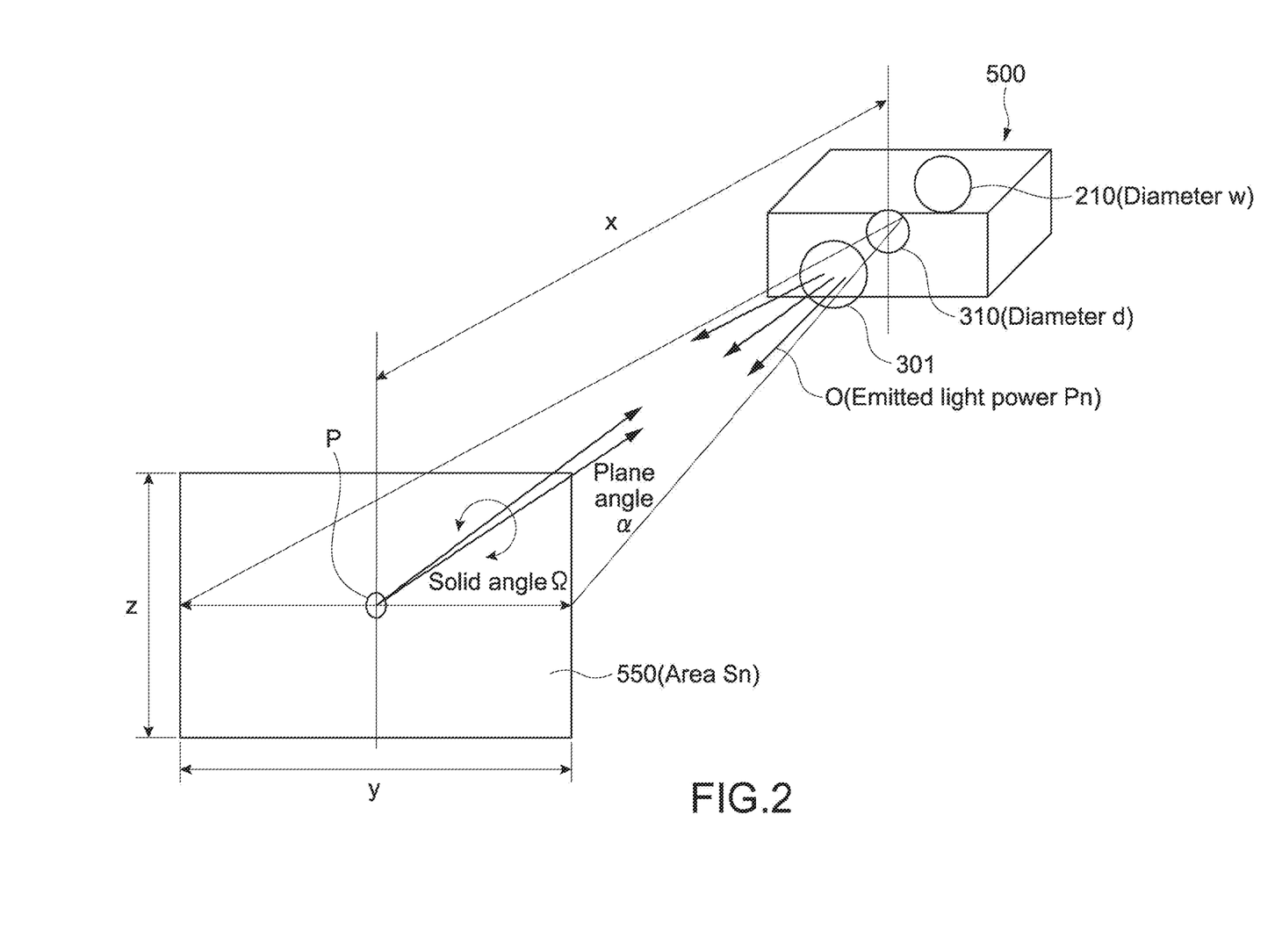
FIG. 2 A schematic diagram for describing a specific calculation example of a reference distance.

FIG. 2 is a schematic diagram for describing a specific calculation example of the reference distance. In FIG. 2, the following parameters necessary for calculating the reference distance are shown.

diameter w (unit: m) of an emission panel 210
diameter d (unit: m) of an exit pupil 310
emitted light power Pn (unit: W) of the emitted light O emitted from the emission surface 301
distance x (unit: m) from the exit pupil 310 to an observation position P
area Sn(x) (unit: m$^2$) of a projection surface 550 in the observation position P
height z (unit: m) of the projection surface 550
width y (unit: m) of the projection surface 550
solid angle Ω (unit: steradian) when viewing the exit pupil 310 from the observation position P
plane angle α (plane angle in width direction) (unit: radian) when viewing the exit pupil 310 from the observation position P Among them, the emitted light power Pn and the area Sn are parameters defined for each type of the projection lens section 305 (hereinafter, sometimes referred to as projection lens section Mn) mounted.

The emission panel 210 schematically indicates three light modulators that generate an image and the combining optical system in the image generator 200. The size of the emission panel 210 is equivalent to the size of each of the light modulators (three light modulators have the same size). Further, the diameter w of the emission panel is equal to a diameter of the image light I emitted from the image generator 200. The exit pupil 310 is an image as viewed from an emission lens side of the projection section 300. A diameter d of the exit pupil 310 is changed by controlling the diaphragm mechanism.

The reference distance can be calculated on the basis of, for example, the illuminance of the emitted light O. An illuminance in the observation position P at the distance x from the exit pupil 310 is denoted by L(x). Then, with a predetermined illuminance Ls being the predetermined threshold, a distance x such that an illuminance L(x) is approximately equal to the illuminance Ls is calculated. The reference distance can be calculated on the basis of the calculated distance x.

Note that a predetermined illuminance Ls that is a threshold is a illuminance that may affect the retina, for example. The illuminance Ls can be expressed in other words, as a safety limit value, for example. Similarly, the reference distance can also be expressed in other words, as a hazard distance, for example.

The distance x is a distance from the exit pupil 310 to the observation position P. Therefore, by converting this into the distance from the emission surface 301, for example, the reference distance can be calculated. Alternatively, if the position of the exit pupil 310 is located on an inner side of the image display apparatus 500 with respect to the emission surface 301, the calculated distance x may be used as the reference distance as it is. Hereinafter, the description will be made assuming that the calculated distance x with the exit pupil 310 being a reference is a reference distance x as it is.

[Calculation Method 1]<Case where Arbitrary Illuminance Ls is Used as Threshold>

The illuminance L(x) in the observation position P is expressed according to Expression (1) below, using the emitted light power Pn and the area Sn(x) of the projection surface 550 at the distance x.

[Expression 1]

$$L(x)=Pn/Sn(x) \ [W/m^2] \quad (1)$$

Here, it is assumed that the projection ratio of the projection lens section Mn (ratio of image width to the projection distance) is denoted by Tn and the aspect ratio of a projection screen is denoted by k. Then, Tn=y/x and k=z/y are established. Using them, the area Sn(x) of the projection surface 550 is expressed by Expression (2) below.

[Expression 2]

$$Sn(x)=y \times z=x/Tn \times x/Tn \times k \ [m^2] \quad (2)$$

Note that the projection ratio Tn is calculated on the basis of information output from the zoom-information output unit of the projection lens section 305.

Expression (3) below can be obtained by substituting Expression (1) by Expression (2).

[Expression 3]

$$L(x)=(Pn \times Tn^2)/(x^2 \times k) \quad (3)$$

A reference distance x can be determined according to Expression (4) below such that this L(x) is approximately equal to Ls that is the threshold.

[Expression 4]

$$x=(Pn/(Ls \times k))^{1/2} \times Tn \ [m] \quad (4)$$

For example, in this manner, the reference distance x can be calculated on the basis of the value of the projection ratio Tn or other parameter values during projection. When the emitted light power Pn or the projection ratio is changed, for example, the reference distance x can appropriately be calculated using a parameter value corresponding thereto. Further, also when the projection lens section Mn mounted is replaced, the reference distance x can be calculated according to the expression above by changing Pn, Sn(x), Tn, and the like.

Further, also when the user's operation is input via the operation section 450 and the parameter values are changed, the reference distance x can appropriately be calculated corresponding thereto. That is, in this embodiment, the reference distance x can be calculated according to a user's operation in real time.

The predetermined threshold Ls used for the above-mentioned calculation may be appropriately set. For example, the operator performs simulation or the like on the image display apparatus 500 to be manufactured. With this, the predetermined threshold Ls may be set. Further, during use of the image display apparatus 500, the predetermined threshold Ls may be appropriately adjusted by the user. Further, as shown below, a value conforming to the international standards may be set as the predetermined threshold Ls.

[Calculation Method 2]<when General Lamp Safety International Standards are Used as Threshold>

Using a retinal thermal hazard threshold reported by International Commission on Non-Ionizing Radiation Protection (ICNIRP) as a safety indicator for general lamps, the reference distance x can be calculated. In the ICNIRP (ICNIRP guidelines on limits of exposure to laser radiation of wavelengths between 180 nm and 1,000 μm. Health Physics 105 (3): 271-295, 2013), the illuminance $L(x)$ is replaced by a radiant intensity with respect to the light source of the illuminance, i.e., the luminance of the light source $[L(x)/\Omega(x)]$, as a determination criteria. Then, $28000/\alpha(x)(W/(m^2 \cdot sr))$ is defined as the retinal thermal hazard threshold of visible light that is a determination value. Therefore, the distance x satisfying $L(x)/\Omega(x)=28000/\alpha(x)$ is the reference distance x(m).

In comparison with the retinal thermal hazard threshold, weighting for each wavelength of the emitted light O is uniformly 1.0 in a visible light region. Therefore, in the image display apparatus 500 as in this embodiment mainly using visible light, calculation of the illuminance $L(x)$ can be relatively easily derived from emitted light power P.

With the plane angle $\alpha$ when viewing the light source, the solid angle $\Omega$ is $\Omega=\pi\alpha^2/4$. Using this relationship, Expression (5) and Expression (6) below are derived. Note that $\alpha n$ in the expression means a plane angle $\alpha$ defined for each projection lens section Mn mounted. Note that the plane angle $\alpha$ will be also referred to as a visual angle.

[Expression 5]

$$4L(x)/\pi\alpha_n^2 = 28000/\alpha_n \quad (5)$$

$$L(x) = 7000 \times \pi \times \alpha_n \quad (6)$$

Further, a plane angle $\alpha n$ is an angle when viewing the diameter d of the exit pupil 310 at the distance x, and hence $\alpha n = d/x$ is established. Further, with the diameter w of the emission panel, an F-number Fn of a lens of the projection lens section Mn, the projection ratio Tn, a factor gn defined for each projection lens section Mn, the diameter d, $d=w \cdot Tn \cdot gn/Fn$ is established. On the basis of the relationship therebetween, $\alpha n$ is expressed by Expression (7) below and the illuminance $L(x)$ is expressed by Expression (8) below.

[Expression 6]

$$\alpha_n = (w \times Tn \times gn)/(Fn \times x) \quad (7)$$

$$L(x) = 7000 \times \pi \times (w \times Tn \times gn)/(Fn \times x) \quad (8)$$

Using Expression (8) and Expression (3) above, the reference distance x satisfying $L(x)/\Omega(x)=28000/\alpha(x)$ can be determined according to Expression (9) below.

[Expression 7]

$$x = 4.6 \times 10^{-5} \times (Pn \times Tn \times Fn)/(w \times gn \times k) \quad (9)$$

As described above, $[L(x)/\Omega(x)]$ corresponds to the luminance of the light source and is used as "the determination criteria value based on the luminance of the light source" in this embodiment. In this manner, it is also possible to calculate the luminance of the light source on the basis of the illuminance of the emitted light O and calculate the reference distance by using it. Note that, without the illuminance of the emitted light O, the luminance of the light source may be directly calculated by actual measurement and the calculated luminance may be used as the determination criteria value.

[Calculation Method 3]<when Laser Safety International Standards are Used as Threshold>

Using the retinal thermal hazard threshold defined by the international standards of International Electrotechnical Commission (IEC) as a safety indicator for laser devices, the reference distance x can be calculated. In IEC60825-1-2014, some measurement methods are defined for safety evaluation of laser light emitted from a laser device. Representative measurement out of them is measurement using a circle having a diameter of 7 mm at a position spaced from the light source by 100 mm as an opening for emitted-luminance measurement. In this measurement, a limit value (class upper limit value) of a retinal thermal hazard due to visible light from a dispersive light source of a class 2, for example, with respect to a light flux passing through the opening is set to $C_6 \cdot 10^{-3}(W)$.

Here, $C_6$ is a ratio of an angle (visual angle $\alpha$) when viewing the exit pupil 310 from a measurement position to a minimum visual angle (0.0015 rad). The value that takes the visual angle $\alpha$ ranges from 0.0015 rad to 0.1 rad and $C_6$ is 66.7 at maximum. When the upper limit value of the class 2 is employed as the predetermined threshold conforming to the international standards, the reference distance x(m) can be calculated as follows.

The area of the opening having a diameter of 7 mm is $1.2 \cdot 10^{-5} \cdot \pi (m^2)$, and hence an emission power passing therethrough is $L(x) \cdot (1.2 \cdot 10^{-5} \cdot \pi)(W)$. A reference distance x such that this is equal to $C_6 \cdot 10^{-3}(W)$ above may be calculated.

This calculation is classified depending on the size of the exit pupil 310. That is, depending on the magnitude of the visual angle $\alpha$, the reference distance x is calculated as follows. When the visual angle $\alpha$ is 0.0015 rad or more, 0.1 rad or less, Expression (10) below is established.

[Expression 8]

$$L(x) \times (1.2 \times 10^{-5} \times \pi) = \alpha \times 10^{-3}/0.0015 \quad (10)$$

Using this Expression (10) and Expressions (3) and (8) above, the reference distance x can be determined according to Expression (11) below.

[Expression 9]

$$x = 5.7 \times 10^{-5} \times (Pn \times Tn \times Fn)/(w \times gn \times k) \quad (11)$$

When the visual angle $\alpha$ is above 0.1 rad, $C_6$ is fixed at a maximum value of 66.7 and the reference distance x is as in Expression (12) below.

[Expression 10]

$$x = 2.4 \times 10^{-2} \times Tn \times Pn^{1/2}/k^{1/2} \quad (12)$$

When the visual angle $\alpha$ is below 0.0015 rad, $C_6$ is kept at a minimum value of 1 and the reference distance x is as in Expression (13) below.

[Expression 11]

$$x = 3.6 \times 10^{-4} \times Tn \times Pn^{1/2}/k^{1/2} \quad (13)$$

As exemplified as the calculation methods 1 to 3, when the operator or the user sets a safety limit value (predetermined threshold), the reference distance x can be calculated by using the property value of the projection lens section mounted and an optical property value or the like of an image display apparatus main body. Further, by the use of the values conforming to the international standards, the reference distance can be calculated with a high reliability.

[Calculation Method 4]<when Table Provided with Reference Distance in Advance is Used>

A look-up table for associating the property of the emitted light O with the reference distance may be stored in the storage unit. The reference distance may be calculated using this table. For example, a table for associating the projection ratio with the reference distance is stored and the reference distance is calculated by the calculator 410 referring to this table. With this, the reference distance can be simply calculated without complicated arithmetic operations. As a matter of course, the parameters associated with the reference distance are not limited and various parameters such as the light emission property of the light source section 100 and the projection property of the projection section 300 may be used.

The look-up table is a table indicating correspondence between a variable parameter (emission power, projection ratio, aspect ratio, etc.) and the reference distance. The image display apparatus 500 includes the table in a combination with a predetermined projection section 300. The table may be created by actual illuminance measurement or luminance measurement in the configuration of the image display apparatus 500. Alternatively, the table may be created as a result of calculation according to the above-mentioned calculation methods 1/2/3, for example.

When a plurality of types of interchangeable projection lens sections 305 are used, it is only necessary to store tables corresponding to the plurality of types of projection lens sections 305. From the plurality of tables, a table corresponding to the projection lens section 305 mounted on the mounting section 505 is read out. Then, the reference distance is calculated by referring to this table and matching with the variable parameter (emission power, projection ratio, aspect ratio, etc.) of the projection section. Note that the identification for the projection lens section 305 mounted can be performed using a memory or the like of the projection lens section 305 or by another identification method.

A table for each projection lens section 305 is stored, and hence the reference distance can be easily calculated with respect to each of the plurality of mountable projection lens sections 305.

Figure 3:
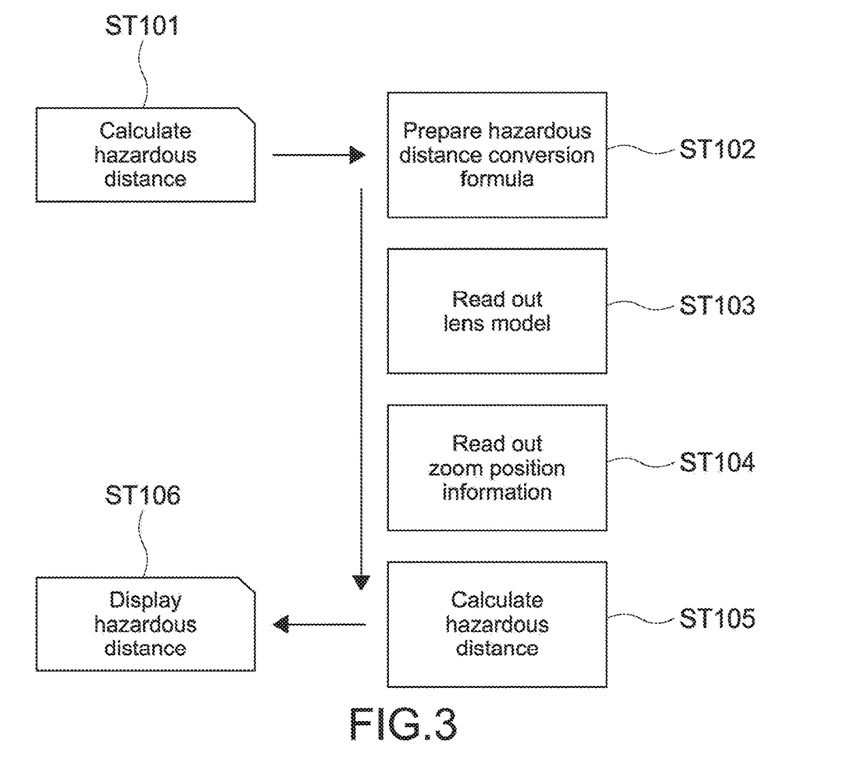
FIG. 3 A flowchart showing a calculation example of the reference distance when a plurality of types of projection lens sections are used.

FIG. 3 is a flowchart showing a calculation example of a reference distance when the plurality of types of projection lens sections 305 are used. FIG. 3 shows a case where the reference distance is calculated using the information of the zoom position (projection ratio). Further, the hazardous distance in the figure corresponds to the reference distance.

When calculation of a hazardous distance is started (Step 101), a conversion formula for calculating the hazardous distance is prepared (Step 102). When the table is used, Step 102 is not executed. According to a predetermined identification method, a model of the projection lens section 305 is read out (Step 103) and information of a zoom position (projection ratio) is read out (Step 104). The information of the zoom position is output from the zoom-information output unit of the projection lens section 305.

A hazardous distance is calculated on the basis of the prepared conversion formula and the information of the zoom position (Step 105). When the table is used, the hazardous distance is calculated by referring to the projection ratio information and the table. The calculated hazardous distance is displayed on the image (Step 106). This is an example of notification of the information on the influence of the emitted light O to be described next.

The example of notification of the information on the influence of the emitted light O, which is based on the calculated reference distance, will be described. The information on the influence of the emitted light O is typically information including the calculated reference distance and used for notifying the user of the reference distance.

The notification section 420 generates the image information including the reference distance and displays it on the screen or the like. Hereinafter, an image displayed on the basis of the image information including the reference distance is referred to as a hazard notification image. By displaying the reference distance as an image, the safety in use can be further improved.

Figure 4:
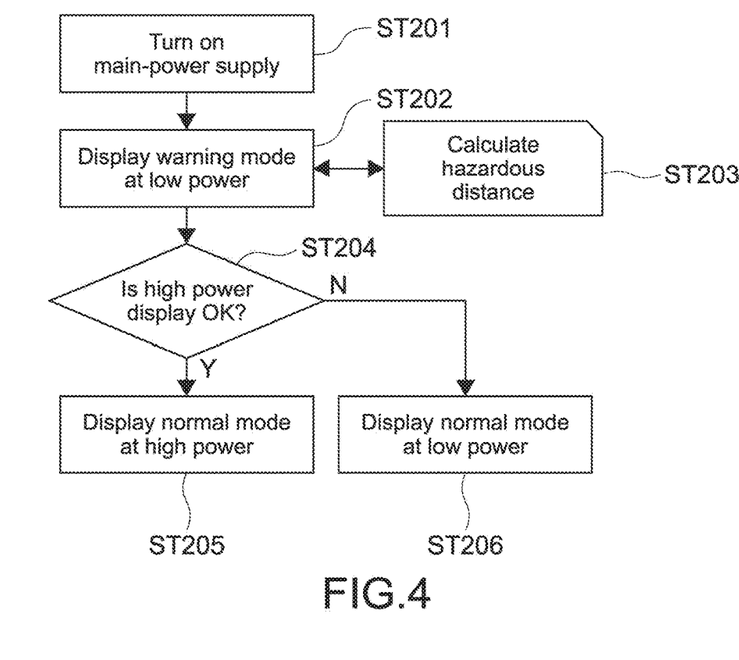
FIG. 4 A flowchart showing an image display example including display of a hazard notification image.
Figure 5:
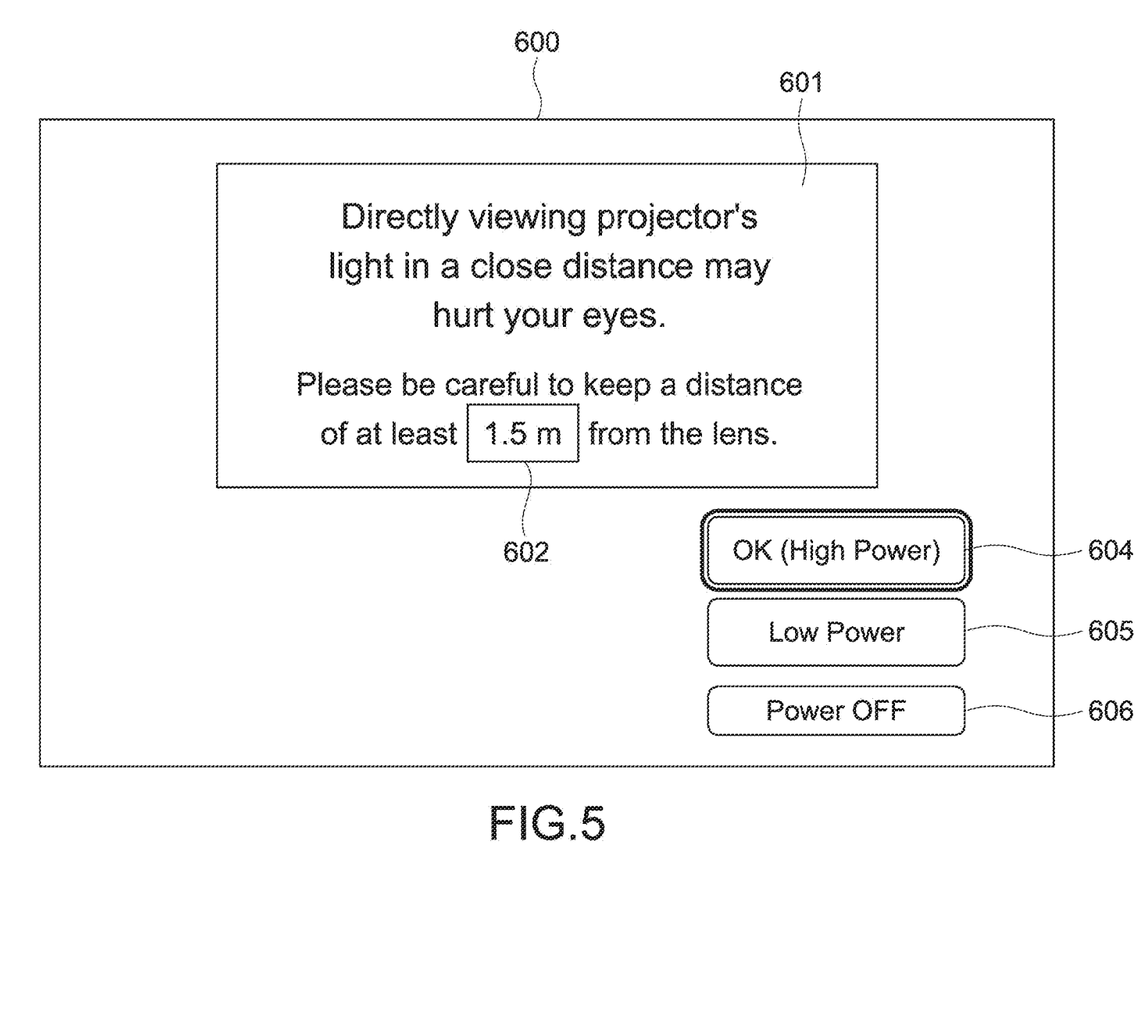
FIG. 5 A schematic diagram showing an example of the hazard notification image.
Figure 6:
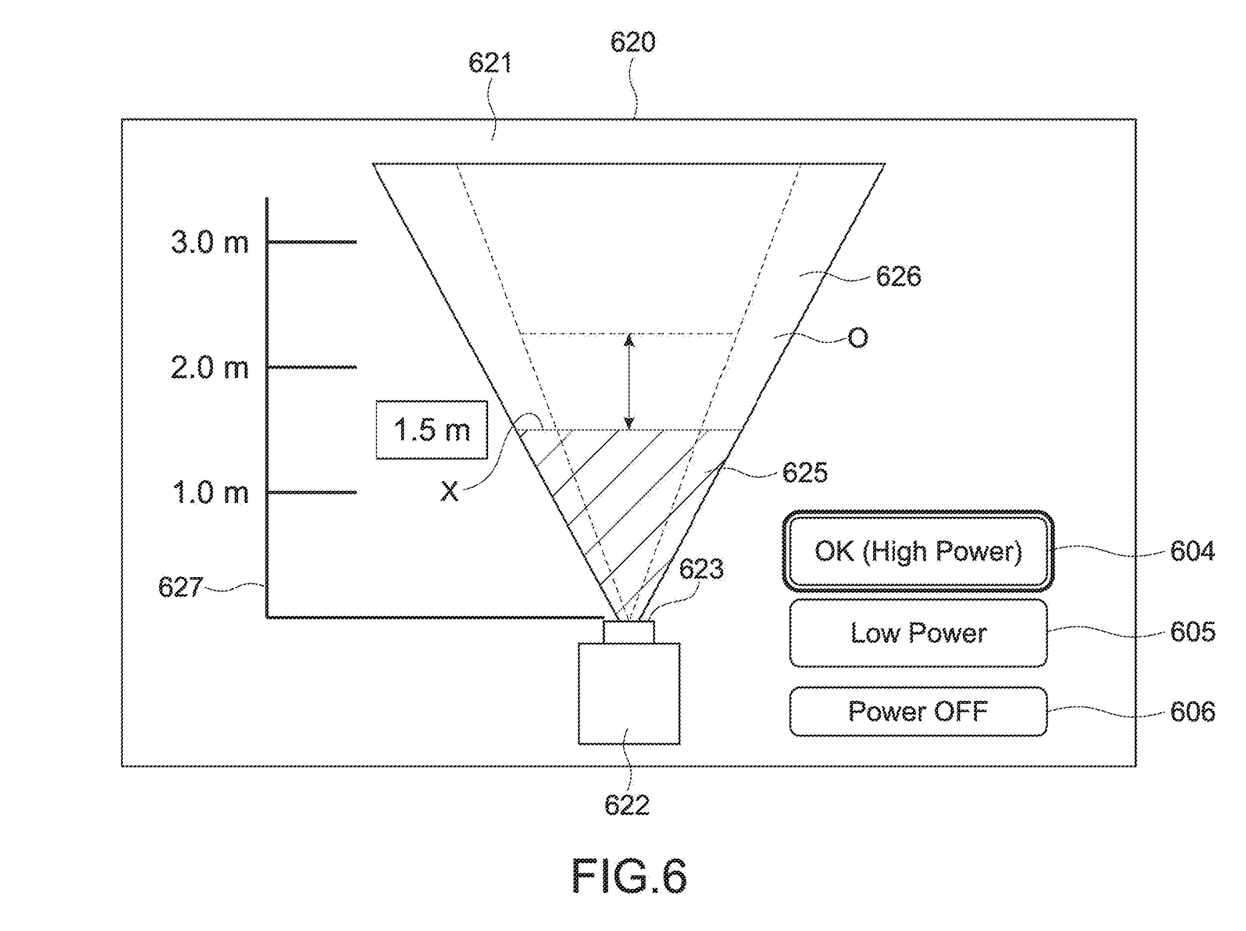
FIG. 6 A schematic diagram showing an example of the hazard notification image.

FIG. 4 is a flowchart showing an image display example including display of the hazard notification image by the image display apparatus 500. FIGS. 5 and 6 are schematic diagrams each showing an example of the hazard notification image.

The main power supply of the image display apparatus 500 is turned on (Step 201) and a warning mode is displayed at low power (Step 202). The low power refers to a mode on which the emitted light power is made lower than usual for projecting the image. The image display is performed at low power immediately after the main power supply is turned on, and hence the influence on the safety due to the emitted light O immediately after lighting can be reduced.

The display of the warning mode means display of the hazard notification image which is illustrated in FIGS. 5 and 6. In Step 203, calculation of the hazardous distance is started in response to "ON" of the main power supply, and the reference distance is calculated. The hazard notification image is displayed on the basis of the calculated reference distance.

A hazard notification image 600 illustrated in FIG. 5 includes a text display unit 601 and a reference distance display unit 602. The text display unit 601 displays the text of the contents for attracting attention to the emitted light O. The reference distance display unit 602 displays the reference distance. The reference distance display unit 602 is set at a position that forms a part of the text. In this manner, the reference distance is specified, and hence the safety in use is improved.

When a parameter such as a zoom magnification is changed according to a user's operation or the like, the reference distance displayed in the reference distance display unit 602 is correspondingly changed in real time. When the reference distance is changed, an image in which, for example, the reference distance display unit 602 being emphasized may be displayed.

As shown in FIG. 5, the hazard notification image 600 includes a switch button 604 for switching to display at high power, a switch button 605 for switching to display at low power, and a main-power supply button 606 for turning off the main power supply. As described above, the hazard notification image 600 is displayed at low power, and hence the switch button 604 for switching to the high power is active (input standby state).

Note that the high power refers to a mode on which an image is projected with normal brightness. The reference distance is calculated on the basis of the case where the image is displayed at high power. That is, in the example shown in FIG. 5, in the case of projecting an image at high power, a region up to 1.5 m in front of the lens is the warning-required region and a region beyond it is the safe region. As long as the fact is displayed, a specific text displayed on the text display unit 601 is not limited.

A hazard notification image 620 shown in FIG. 6 includes a graphic display unit 621 that graphically displays the reference distance, the warning-required region, the safe region, and the like. In this example, the emitted light O emitted from a projector 622 and an emission surface 623 thereof is displayed in the graphic display unit 621. The emitted light O is displayed so as to be spread at an angle depending on a projection angle at that time.

The region at the reference distance x (1.5 m) in the emitted light O is displayed as a warning-required region 625. A region beyond the reference distance x is displayed as a safe region 626. The warning-required region 625 and the safe region 626 are displayed, for example, with different colors. Further, in this example, a scale 627 schematically showing the distance from the emission surface 623 is displayed on the graphic display unit 621.

When the projected light power, the projection ratio, and the like are changed, the reference distance x is correspondingly changed. Further, a spread angle of the emitted light O displayed depending on the change in the projection ratio may be changed. For example, a moving image (animation) indicating a change from the emitted light O (warning-required region and safe region) indicated by the broken lines in FIG. 6 to the emitted light O (warning-required region and safe region) indicated by the solid lines is displayed. In this manner, the graphic display is executed, and hence the user can sense the reference distance, the warning-required region, and the safe region.

Referring back to the flowchart of FIG. 4, whether or not switching to the display at high power has been input is determined (Step 204). Typically, the switch button 604 is pressed by the user who has confirmed that there is no person near a hazardous region 625. Then, the processing proceeds to Step 205 and a normal mode is displayed at high power. The display of the normal mode means display of predetermined content of a video or the like that, for example, the user wishes to view.

When the switch button 205 is not pressed, the processing proceeds to Step 206 and the normal mode is displayed at low power. For example, in the case of viewing an image from the vicinity of the hazardous region 625, the low power is selected in view of the safety. Otherwise, when the low power is used as a so-called saving display mode, the saving display mode may be selected.

When the switch button 604 is not pressed in a predetermined time, the display of the normal mode at low power may be set. Alternatively, after the switch button 605 is pressed and becomes active, this button may be pressed again. Additionally, a method for selecting the display of the normal mode at low power is not limited.

Note that the configuration of the hazard notification image is not limited and a still image or a moving image having any configuration may be appropriately generated and displayed.

Further, although, in the above-mentioned example, the image display is performed at low power immediately after the main power supply is turned on, it is not limited thereto. The power of the image display immediately after the main power supply is turned on may be set by the user. For example, when the image display is performed in a state in which the safety is ensured, the image may be displayed at high power from the start by user's settings. With this, it becomes possible to save the trouble of inputting switching to the high power for every use.

Figure 7:
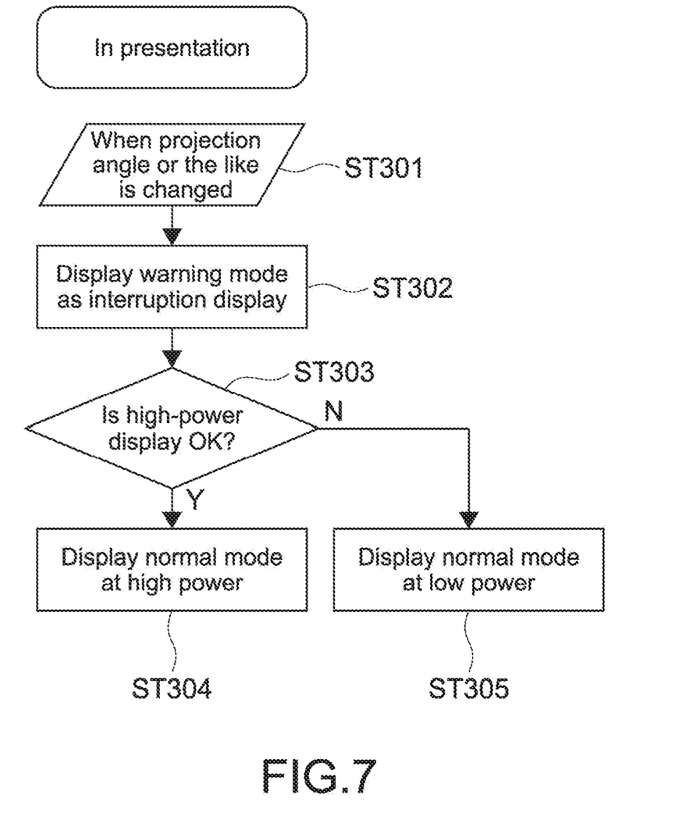
FIG. 7 A flowchart showing a display example of the hazard notification image during projection of an image.
Figure 8:
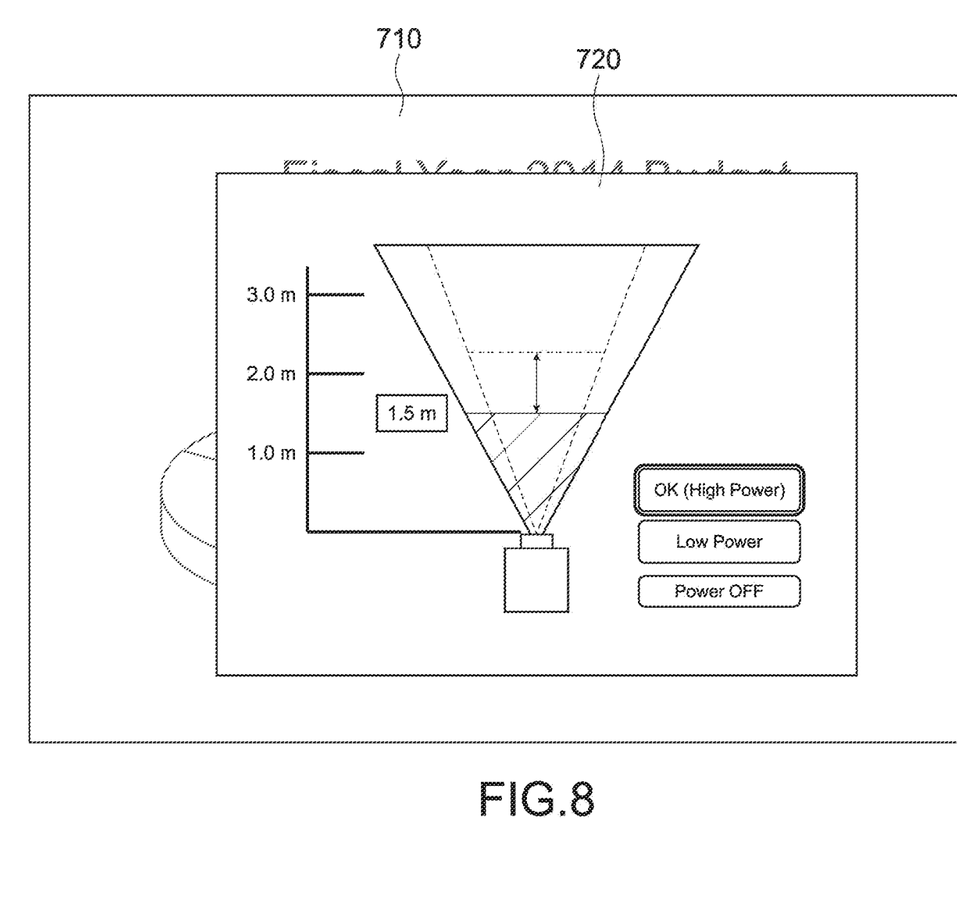
FIG. 8 A schematic diagram showing a display example of the hazard notification image.

FIG. 7 is a flowchart showing a display example of the hazard notification image when an image has already been projected. FIG. 8 is a schematic diagram showing a display example of the hazard notification image.

It is assumed that a projection ratio or the like is adjusted according to a user's operation while the image is projected and the presentation or the like is performed (Step 301). Then, as shown in FIG. 8, a hazard notification image 720 is displayed as interruption display with hazard notification image 720 being overlapped on an image 710 being displayed (Step 302). With this, it becomes possible to easily grasp changes in reference distance and warning-required region and the safety in use can be further improved.

It is assumed that, in the presentation, the hazard notification image 720 is displayed by interruption display while the image 710 is displayed at high power. In this case, switching to display at low power may be automatically performed. Then, either one of the high power and the low power may be selected on the basis of an operation with respect to the hazard notification image (from Step 303 to Step 305).

For example, if the position of the user in use of the projector is obviously safe, the interruption display shown in FIG. 8 does not need to be executed. That is, whether or not to perform the mode on which the interruption display is performed may be selectable. When the interruption display is not performed, the presentation or the like can smoothly progress.

The notification of the information on the influence of the emitted light O, which is based on the calculated reference distance x, is not limited to the display of the hazard notification image. For example, when the image display apparatus 500 includes a mechanism (e.g., may be realized by well known configuration) capable of outputting audio, the calculated reference distance may be output as audio. For example, contents displayed on the text display unit 601 of FIG. 5 may be output as audio.

Further, it is assumed that the image display apparatus 500 includes a distance sensor and the like (e.g., well known one may be used) capable of measuring the distance from the emission surface. In this case, when an object has been detected at a distance shorter than the reference distance in a projection region or when the object has been detected at or near the reference distance, alarm image information or alarm sound may be output. That is, an entry or an entry possibility in the warning-required region may be presented by the alarm image information or the alarm sound. This output includes output of the information on the influence of the emitted light. In this manner, also when the detected information is output by the sensor, the safety in use can be improved.

Hereinabove, in the image display apparatus according to this embodiment, the reference distance x is calculated as the distance from the emission surface 301 that serves the determination criteria for the influence of the emitted light O. Then, the information on the influence of the emitted light O is presented on the basis of this reference distance x. With this, the safety in use can be improved.

For example, in order to reduce the hazard to the user's eyes, it is conceivable to attach an attention label to a device or to add a description saying "Not directly view the lens" to an instruction manual. However, with this method, it is likely that actual effects may be insufficient. Further, also when an image for calling attention is displayed on the screen at the start of projection, it is conceivable that the effects are still low if the hazard is merely uniformly displayed.

In view of such a thing, the inventor has designed calculating a reference distance for classifying a warning-required region and a safe distance and outputting an image, audio, or the like for attracting attention on the basis of this reference distance. In addition, also when a projection lens is replaced or the properties of the emitted light O are changed according to a user's operation or the like, the safety in use can be further improved by calculating the reference distance in real time and presenting that information.

Other Embodiments

The present technology is not limited to the above-mentioned embodiments and various other embodiments can be realized.

Figure 9:
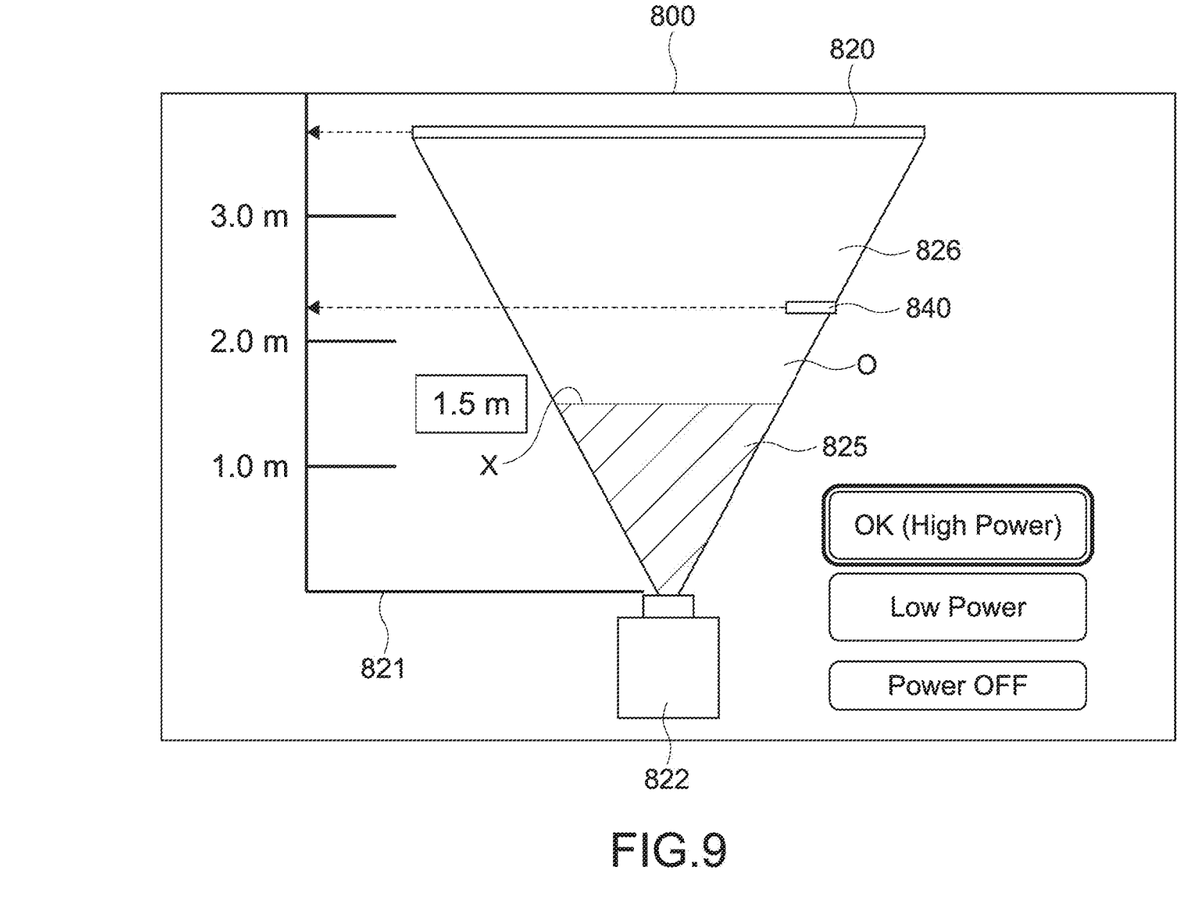
FIG. 9 A schematic diagram showing another example of the hazard notification image.

For example, FIG. 9 is a schematic diagram showing another example of the hazard notification image. Note that it is assumed that the image display apparatus is provided with an arbitrary distance sensor capable of measuring a distance from the emission surface.

In this example, a distance up to the screen on which the image is to be projected is calculated. On the basis of this distance, a screen 820 is displayed in a hazard notification image 800. Further, in the hazard notification image 800, a scale 821 including the distance up to the screen 800 is displayed. Such display enables the user to sense an arrangement relationship from a projector 822 to the screen, the reference distance x, a positional relationship between a warning-required region 825 and a safe region 826, and the like.

Further, in this example, an obstacle that shields the emitted light O is detected together with the distance to this obstacle. Then, the detected obstacle 840 is displayed in a position at the detected distance in the hazard notification image 800. For example, when the user puts the hand over the emitted light O, a distance up to this hand is calculated. Then, the obstacle 840 is displayed in a position at the calculated distance. In this manner, the obstacle 840 is displayed, and hence it becomes possible to specifically grasp, for example, whether the current position of the user is a position included in the warning-required region 825 or a position included in the safe region 826.

If an obstacle exists in the warning-required region, parameters such as the power of the projected light and the projection ratio may be automatically adjusted such that this obstacle is included in the safe region and the reference distance may be changed.

In a lens interchangeable image display apparatus, the table may be stored in a memory or the like of a projection lens section mounted. For example, a sign (ID number) is set for each projection section lens and the ID number is recognized on a side of the image display apparatus. In this manner, the table linked with this ID number may appropriately be read out from the memory of the projection lens section or the storage unit of the image display apparatus.

The same projection lens section may be mountable on a plurality of types of image display apparatuses. In this case, even with the same projection lens section, a zoom range and the like may be limited by the image display apparatus. Further, the same table may be stored in both of the memory of the projection lens section and the storage unit of the image display apparatus. In this case, either one of those tables may be preferentially used or the both table may be linked.

Further, the projection lens section for which the corresponding table has not been prepared may be mountable. In this case, the reference distance is calculated without the table. Alternatively, without calculation of the reference distance, a message indicating the fact may be displayed.

Note that the effects described in the present disclosure are merely examples and not limitative. Further, other effects may be provided. The above description of the plurality of effects does not imply that those effects are necessarily exerted at the same time. It implies that at least any of the above-mentioned effects can be obtained in a manner that depends on the conditions, for example. As a matter of course, effects not described in the present disclosure may be exerted.

Further, at least two feature parts of the feature parts of the above-mentioned embodiments can also be combined. That is, the various feature parts described in the embodiments may be arbitrarily combined without distinction of the embodiments.

Note that the present technology can also take the following configurations.

(1) An image display apparatus, including:

an image projection section that includes an emission surface and projects an image by emitting light from the emission surface;

a calculator that calculates a reference distance from the emission surface, the reference distance serving as a determination criteria for an influence of emitted light that is emitted from the image projection section; and a notification section that notifies about information on the influence of the emitted light on the basis of the calculated reference distance.

(2) The image display apparatus according to (1), in which the calculator calculates the reference distance on the basis of a property of the emitted light.

(3) The image display apparatus according to (1) or (2), in which the calculator calculates the reference distance on the basis of an illuminance of the emitted light or a luminance of the light source.

(4) The image display apparatus according to (3), in which the calculator calculates, as the reference distance, a distance from the emission surface such that a determination criteria value based on the illuminance of the emitted light or the luminance of the light source is approximately equal to a predetermined threshold.

(5) The image display apparatus according to (4), in which the predetermined threshold is a value conforming to international standards.

(6) The image display apparatus according to any one of (1) to (5), in which the image projection section is capable of projecting the image at a predetermined projection ratio, and the calculator calculates the reference distance on the basis of the projection ratio.

(7) The image display apparatus according to any one of (1) to (6), further including an operation section that receives a user's operation, in which the calculator calculates the reference distance according to the user's operation in real time.

(8) The image display apparatus according to any one of (1) to (7), in which information on the influence of the emitted light includes the calculated reference distance.

(9) The image display apparatus according to any one of (1) to (8), in which the notification section generates image information including information on the influence of the emitted light and causes the image projection section to project the image information.

(10) The image display apparatus according to any one of (1) to (9), in which the notification section outputs information on the influence of the emitted light as audio.

(11) The image display apparatus according to any one of (1) to (10), further including a storage unit that stores a look-up table for associating a property of the emitted light with the reference distance, in which the calculator calculates the reference distance by referring to the look-up table.

(12) The image display apparatus according to (11), in which the image projection section is capable of projecting the image at a predetermined projection ratio, and the storage unit stores the look-up table for associating the projection ratio with the reference distance.

(13) The image display apparatus according to (11) or (12), in which the image projection section includes a mounting section on which a plurality of types of projection lens sections are mountable, and the storage unit stores the look-up table corresponding to the plurality of types of projection lens sections.

DESCRIPTION OF SYMBOLS

O emitted light
x reference distance
100 light source section
200 image generator
301 emission surface
305 projection lens section
400 controller
410 calculator
420 notification section
450 operation section
500 image display apparatus
505 mounting section
600, 620, 720, 800 hazard notification image

What is claimed is:

1. An image display apparatus, comprising:
a light source section configured to emit light;
an image projection section that includes an emission surface, wherein the image projection section is configured to project an image based on the emitted light from the emission surface; and
a controller comprising:
  a calculator configured to calculate a reference distance from the emission surface to a determined position, wherein the reference distance is a distance at which power of the emitted light per unit area at the determined position is equal to or less than a determined value; and
  a notification section configured to notify information related to the calculated reference distance, wherein
the light source section is further configured to emit the light at a determined power,
the calculator is further configured to calculate the reference distance in response to a power supply of the image display apparatus turned on,
the controller is configured to determine whether to continue emission of the light from the light source section at the determined power or to switch to emission of the light from the light source section at a power higher than the determined power, and
the switch is after the notification of the information by the notification section.

2. The image display apparatus according to claim 1, wherein
the calculator is further configured to calculate the reference distance based on a property of the emitted light.

3. The image display apparatus according to claim 1, wherein
the image projection section is further configured to project the image at a determined projection ratio, and
the calculator is further configured to calculate the reference distance based on the determined projection ratio.

4. The image display apparatus according to claim 1, further comprising
an operation section configured to receive a user operation,
wherein the calculator is further configured to calculate the reference distance based on the user operation in real time.

5. The image display apparatus according to claim 1, wherein
the notification section is further configured to:
  generate image information including information on an influence of the emitted light; and
  control the image projection section to project the image information.

6. The image display apparatus according to claim 1, wherein
the notification section is further configured to output information on an influence of the emitted light as an audio.

7. The image display apparatus according to claim 1, further comprising
a storage unit configured to store a first look-up table for associating a property of the emitted light with the reference distance, wherein
the calculator is further configured to calculate the reference distance to based on the first look-up table.

8. The image display apparatus according to claim 7, wherein
the image projection section is projecting further configured to project the image at a determined projection ratio, and
the storage unit is further configured to store a second look-up table for associating the determined projection ratio with the reference distance.

9. The image display apparatus according to claim 7, wherein
the image projection section further includes a mounting section on which a plurality of types of projection lens sections are mountable, and
the storage unit is further configured to store a third look-up table corresponding to the plurality of types of projection lens sections.

10. The image display apparatus according to claim 1, further comprising
an operation section configured to receive a user operation, wherein
the controller is further configured to determine, based on the user operation, whether to continue the emission of the light from the light source section at the determined power or to switch to the emission of the light from the light source section at the power higher than the determined power, and the switch is after the notification of the information by the notification section.

* * * * *